United States Patent

McFadden

[15] 3,704,360

[45] Nov. 28, 1972

[54] CARD READER

[72] Inventor: Bruce R. McFadden, 92 Ardmore Street, Framingham, Mass.

[22] Filed: April 15, 1970

[21] Appl. No.: 28,759

[52] U.S. Cl. ...235/61.11 R, 179/90 CS, 271/DIG. 9, 340/149 A, 235/61.7 B

[51] Int. Cl. ....H04m 17/02, G06k 7/015, B65h 5/22

[58] Field of Search....235/61.11 D, 61.11 E, 61.7 B; 340/149 A; 271/3, DIG. 9; 318/207 A, 168, 262, 266, 282; 346/74; 179/6.3 CO, 90 CS

[56] References Cited

UNITED STATES PATENTS

| | | | |
|---|---|---|---|
| 3,521,033 | 7/1970 | May | 235/61.11 |
| 3,434,027 | 3/1969 | Cummings | 318/282 |
| 3,474,573 | 10/1969 | Homeyer | 318/282 |
| 3,419,710 | 12/1968 | Mathews | 235/61.11 D |
| 3,320,369 | 5/1967 | Hershey | 179/90 C |
| 3,114,150 | 12/1963 | Calano | 346/74 |
| 2,849,542 | 8/1958 | MacChesney | 235/61.11 D |

OTHER PUBLICATIONS

Bowers, G. W. et al. – "Credit Card Reader"–IBM Tech. Disclosure Bull., Vol. 9, No. 12, p. 1760, May 1967.

*Primary Examiner*—Maynard R. Wilbur
*Assistant Examiner*—Robert M. Kilgore
*Attorney*—Robert T. Dunn

[57] ABSTRACT

Information recorded along a line on a card is detected by driving the card past a detector adjacent the line when the card is inserted into a slot, the drive mechanism then reversing after the information is detected so that the card is expelled from the same slot.

8 Claims, 6 Drawing Figures

INVENTOR
BRUCE R. McFADDEN

Robert T. Dunn
ATTORNEY

INVENTOR
BRUCE R. McFADDEN

Robert T. Dunn
ATTORNEY

CARD READER

DISCLOSURE

This invention relates to apparatus for reading information stored on a card and more particularly to such apparatus into which the card is inserted and which then drives the card past a detector that reads the information and then the card is expelled.

Heretofore, it has been proposed to store information magnetically on a plastic card or paper. The card may be an identification card, such as a charge card, or a merchandise tag. The paper may be a check. The information is read by apparatus into which the card is inserted so that rollers engage the card and drive it past a magnetic head which detects (reads) the information recorded magnetically thereon. The rollers are driven in one direction only and so the card is driven through the apparatus, in one side and out the opposite side. Clearly, employing this procedure for reading a card, the operator has to enter the card at one point and retrieve it at another. For some applications, it is advantageous to retrieve the card from the same port into which it is entered. Furthermore, in such apparatus, the card passes the information detector just once unless additional detectors are included along the line of travel of the card. For example, in such apparatus where the information is encoded magnetically along a stripe on the card, a magnetic head detects the information as the card moves past the head. An advantage could be gained if the card were read more than once before expelled from the apparatus if only to confirm or make a parity check of the detected information. One type of parity check can be made by reading the encoded information on the card forward or backward. Therefore, it is an object of the present invention to provide apparatus for reading sequential information stored on a card in either the forward or reverse directions or in both directions employing but a single detector which the card is driven past.

It is another object of the present invention to provide apparatus into which a card containing information is inserted, the information is read and the card is expelled at the same point it is inserted.

It is another object to provide improved apparatus for reading information encoded on a card or piece of paper.

It is another object to provide improved apparatus for reading information encoded magnetically along at least one line on a card.

In accordance with a principal feature of the present invention, the apparatus for reading information stored on a card includes a mechanism into which the card is inserted for driving the card past a head that detects the information and then the drive mechanism reverses and expells the card along the same path it was inserted. When the card reaches a predetermined point in its travel into the mechanism and while the card is still engaged by the drive mechanism, the mechanism reverses expelling the card.

The information may be read as the card is driven into the mechanism or it may be read as the card is expelled. In either case, the mechanism does not reverse to expell until the area of the card containing the information clears the detector head.

Other objects and features of the present invention will be apparent in view of the following specific description of the best known uses of the invention taken in conjunction with the figures in which.

The card reader described herein and shown in FIGS. 1 to 5 is designed and operated to detect information stored magnetically along a line or stripe on a plastic card which may be a typical charge card. The card may contain printed matter, pictures and embossments as is usual with such cards, and in addition, along a stripe on a face of the card, information is stored magnetically. Such a card is shown in FIG. 6 with a stripe 1 along which the information is stored.

The stripe 1 may be magnetically permeable material in which the information has been encoded just as in magnetic tape or it may consist of minute deposits of magnetically permeable material or hard magnetic material. In any of these cases, the information is detected by a magnetic head 2 fixed to the reader.

Information may also be stored on such cards by embossments, perforations or dark spots. In the case of embossments, the information is detected by a mechanical feeler such as a microswitch. Perforations are usually read by an electrical contact made through the perforations. Dark spots are read optically by a photocell. Features of the present invention are applicable with any of these techniques for encoding and reading information on a card.

Figure 1:
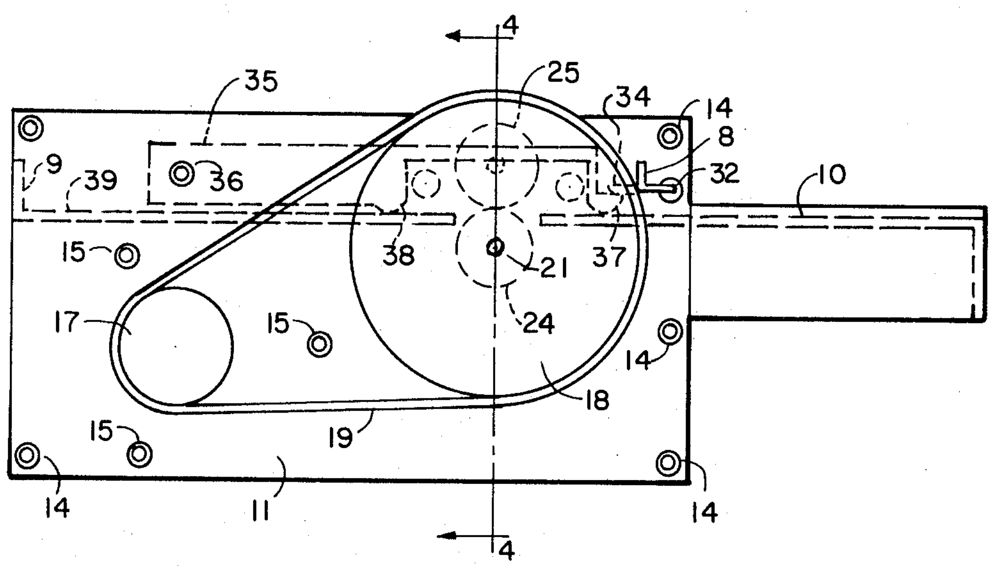
FIG. 1 is a side view of an embodiment of the present invention for reading (detecting) magnetically encoded information on a plastic charge card.
Figure 2:
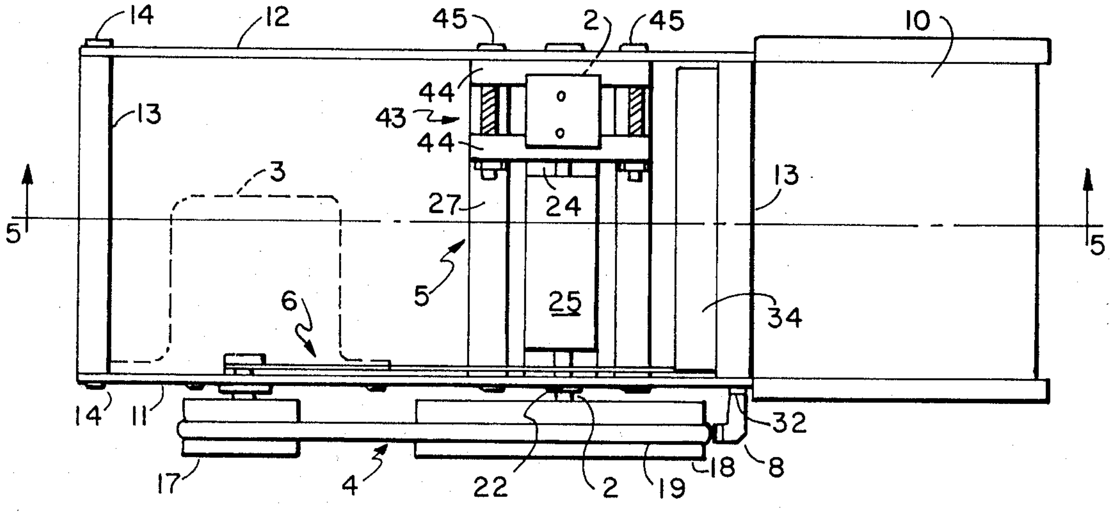
FIG. 2 is a top view of the card reader.
Figure 3:
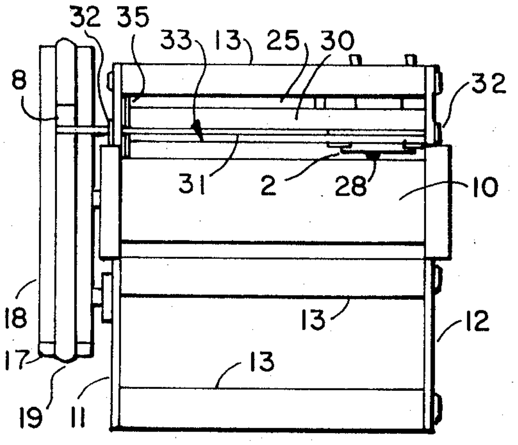
FIG. 3 is a front view of the card reader.
Figure 4:
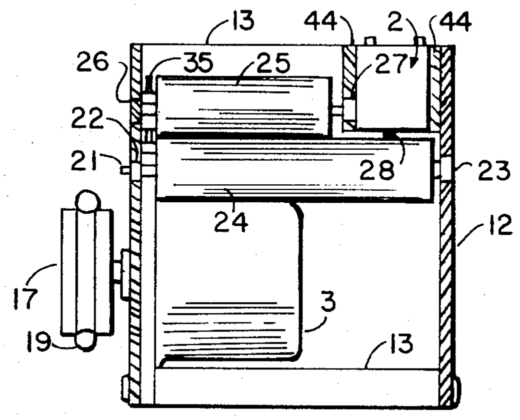
FIG. 4 is a front sectional view taken as shown in FIG. 1.
Figure 5:
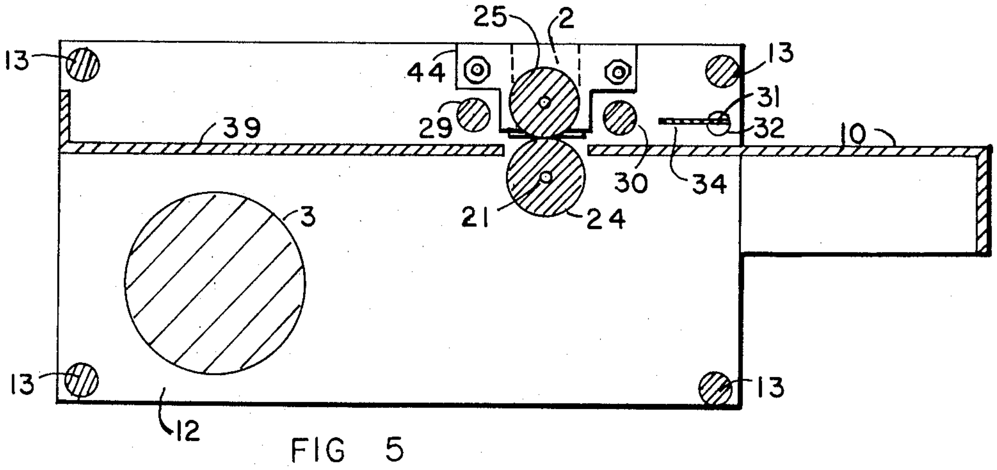
FIG. 5 is a side sectional view taken as shown in FIG. 2.
Figure 6:
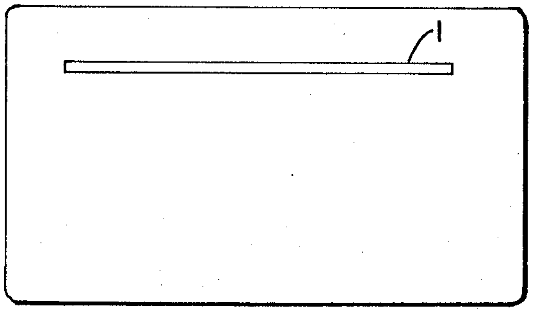
FIG. 6 is a top view of the card

Commencing with FIGS. 1 and 2, a magnetic card reader is shown into which cards such as in FIG. 6 are inserted to be read. The reader includes a magnetic head 2 and a drive mechanism including a motor 3, pulleys 4 and rollers 5 for engaging the card and driving it past the head so that the information stored magnetically along the stripe 1 on the card is detected by the head.

The motor 3 is a synchronous motor having a permanent magnet rotor and is continually energized. It is a characteristic of such motors to start in either direction and so if it is restricted in one direction, it will start in the opposite direction. Normally, before the card is inserted, a brake 8 prevents the motor from rotating except in the forward direction which drives the card into the reader. When the card is inserted, it actuates the lever mechanism 6 which releases the brake 8. Thereafter, when the card abuts the stop 9, the motor can drive it no further in the forward direction and so the motor reverses and drives the card back out of the reader in the reverse direction, expelling it into the tray 10. When the card is expelled, the lever mechanism is released and the brake locks, stopping the motor and preventing rotation in the reverse direction. The motor then immediately reverses and drives again in the forward direction in readiness for the next card.

The stop 9 is located so that the stripe 1 on the card clears the head 2 before the card hits the stop and the stripe is located on the card so that the card hits the stop while still engaged by the rollers 5. Clearly, the magnetic encoded information on the card stripe can be detected and used while the card is moving past the head in either direction. Depending upon the encoding format, an advantage is gained by reading the stripe in both directions. One simple type of parity check can be made by simply counting electrical pulses from the magnetic head and checking the count in both directions to be sure it is the same. A simple up-down counter could be used for this purpose, counting up when the card is read in the inserted direction and down when read in the reverse direction. Failure to count down to zero would indicate, possibly, a faulty reading.

The card reader shown in the figures has few actuated parts and the few actuations are simple. The parts for readers of different size cards are interchangeable to a large extent by virtue of the design. For example, the motor 3, the pulleys 4, the head 2 and lever mechanism 6 as well as the side plates 11 and 12 are interchangeable between readers for different size cards.

The side plates 11 and 12 are spaced according to card width and connected by spacer rods 13 fastened to the plates by screws 14. The motor 3 is a synchronous motor with a fixed magnet rotor. As already mentioned, this type motor will start in either direction and runs at a fixed speed (determined by line frequency). Three screws 15 in plate 11 mount the motor between the plates 11 and 12 with the motor shaft 16 extending through a hole in plate 11 to pulley 17 which drives the flywheel 18 by a belt 19.

The flywheel shaft 21 on bearing 22 in plate 11 and bearing 23 in plate 12 carries the drive roller 24. The idler roller 25 above the drive roller is carried on bearing 26 in plate 11 and bearing 27 in the magnetic head clamp plate 44. The drive and idler rollers are rubber and are adjustable so that the space between can be adjusted and the position of this space can be adjusted to run the card firmly against the magnetic head pick-up 28. Spacer rods 29 and 30 are located next to the rollers to maintain the proper spacing between the plates and also provide a guide for the card.

The brake 2 normally drags on the belt 19 which may be rubber and round in cross section. The brake axel 31 pivots on bearings 32 in the plates 11 and 12. The axel 31 together with the tray 10 defines a slot 33 into which the card is inserted and then expelled. An arm 34 extending from the axel 31 is engaged by the brake release lever 35 that pivots on pin 36. The free end of this lever at 37 rests on the tray 10 and another point 38 closer to the pivot rests on the interior tray 39 which may be an extension of the tray 10. In operation, while the motor is driving in the forward direction, the card is inserted into the slot 33 and the card edge lifts point 37, lifting the axel arm 34 sufficiently to rotate the brake 2 away from the belt so that it does not touch the belt and so cannot jam against the belt. At this point, the motor is free to go in either direction, but continues to drive in the direction started until the inserted edge of the card abuts the stop 9. Before reaching the stop, the card will lift point 38 and so the lever 35 will continue to be lifted even when the card has moved into the reader past point 37. When the card hits the stop 9, the motor stalls and automatically reverses driving the card back out of the reader into the tray 10. Then the card is removed so that point 37 again rests on the tray 10, the brake 8 jams the belt stopping the motor and the motor reverses so that it is again running in the forward direction. At this point, the reader is ready for another card.

The magnetic head 2 is mounted in a clamp 43 consisting of two plates 44 secured together and to the side plate 12 by screws 45. The position of the head in this clamp is adjustable toward and away from the position of the card held by the rollers.

The specific embodiment of the present invention shown by the figures is the best known use of the invention which is applicable as well to other types of readers in addition to the types mentioned herein and is applicable in apparatus for automatic reading information on checks and items other than cards. The appended claims set forth the intended scope of the invention.

What is claimed is:

1. Apparatus for detecting information recorded on a card comprising,
 a card with information stored thereon,
 means for detecting the information,
 means into which the card is inserted for driving the card past the detecting means to detect the information, driven by a motor which drives in the direction of least restriction,
 an arm which pivots in one direction to jam the motor so that it can drive only in the direction of card insertion when so jammed,
 means mechanically moved by the inserted card for actuating the arm after the card is engaged by the driving means, and
 a stop against which the card is driven after the information is read, so restricting the motor that the motor reverses direction and expells the card from the apparatus,
 whereby the card is expelled from the apparatus after the information is detected.

2. Apparatus as in claim 1 and in which,
 the arm pivots in one direction to restrict the motor drive and in the opposite direction when mechanically moved by the inserted card.

3. Apparatus as in claim 1 and in which, the arm normally jams the motor drive so that it can only drive in the direction of card insertion, and the actuating means is mechanically connected to the arm which is mechanically moved by the driven card.

4. Apparatus as in claim 1 and in which,
 the driving means includes a driven roller and an idler roller, and
 the card is inserted between the rollers which drive the card past the detecting means.

5. Apparatus as in claim 1 and in which,
 the motor is energized continually while the reader is in use.

6. Apparatus as in claim 1 and in which,
 the driving means includes a synchronous motor having a permanent magnet rotor.

7. Apparatus as in claim 1 and in which,
 the information is detected while the card is driven in the direction of insertion.

8. Apparatus as in claim 1 and in which,
 the information is detected while the card is driven in the direction opposite the direction of insertion.

* * * * *